(12) United States Patent
Valiulis et al.

(10) Patent No.: US 10,723,376 B2
(45) Date of Patent: Jul. 28, 2020

(54) CAR SEAT HOLDER

(71) Applicants: Stanley Carl Valiulis, Rockford, IL (US); Lindsey Fleischhauer, Naperville, IL (US)

(72) Inventors: Stanley Carl Valiulis, Rockford, IL (US); Lindsey Fleischhauer, Naperville, IL (US)

(*) Notice: Subject to any disclaimer, the term of this patent is extended or adjusted under 35 U.S.C. 154(b) by 15 days.

(21) Appl. No.: 16/149,104

(22) Filed: Oct. 1, 2018

(65) Prior Publication Data

US 2019/0100228 A1    Apr. 4, 2019

Related U.S. Application Data

(60) Provisional application No. 62/565,678, filed on Sep. 29, 2017.

(51) Int. Cl.
| | | |
|---|---|---|
| *A47D 1/10* | (2006.01) | |
| *A47D 7/01* | (2006.01) | |
| *A47D 7/04* | (2006.01) | |
| *A47D 13/02* | (2006.01) | |
| *A47C 1/11* | (2006.01) | |
| *B62B 5/08* | (2006.01) | |
| *B62B 3/14* | (2006.01) | |
| *B60N 2/28* | (2006.01) | |
| *A47F 13/00* | (2006.01) | |

(52) U.S. Cl.
CPC .............. *B62B 5/082* (2013.01); *A47F 13/00* (2013.01); *B60N 2/2842* (2013.01); *B62B 3/14* (2013.01)

(58) Field of Classification Search
CPC ........... A47F 13/00; B62B 5/082; B62B 3/14; B60N 2/2842
USPC ...... 297/256.17; 280/33.991, 33.993; 5/98.1, 5/118
See application file for complete search history.

(56) References Cited

U.S. PATENT DOCUMENTS

| | | | | |
|---|---|---|---|---|
| 1,389,073 A | * | 8/1921 | Schlosser ............... | B60N 3/008 5/118 |
| 1,732,520 A | * | 10/1929 | Leatherman ........... | A47B 31/06 5/118 X |
| 3,037,216 A | * | 6/1962 | Stringer ............... | B60N 2/2854 5/118 |
| 3,574,872 A | * | 4/1971 | Mattila .................. | A47D 13/02 5/118 X |
| 3,784,990 A | * | 1/1974 | Elisofon ................. | A47D 7/04 5/118 X |
| 4,679,840 A | * | 7/1987 | Fry .......................... | A45F 3/22 5/118 X |

(Continued)

*Primary Examiner* — Rodney B White

(57) ABSTRACT

A car seat holder is used to support a portable infant car seat by providing a flexible support. The apparatus comprises a first support, a second support, and a canvas. The first support and the second support are elongated members that extend across a shopping cart. The first support and the second support are rigid members that distribute the weight of an infant carriage device. The canvas is a flexible surface that extends from the first support to the second support across the shopping cart. The canvas provides a mechanism for transmitting the weight of the infant carriage device to the first support and the second support. In this way, the first support and second support hold the canvas in optimal position for holding an infant car seat. This arrangement frees up space within a shopping cart.

18 Claims, 6 Drawing Sheets

(56) References Cited

U.S. PATENT DOCUMENTS

| | | | | |
|---|---|---|---|---|
| 4,807,314 A * | 2/1989 | Fry | ............................ | A45F 3/22 5/118 |
| 4,971,343 A * | 11/1990 | Wood | .................... | B62B 3/1444 280/33.993 |
| 5,096,260 A * | 3/1992 | Hagerstrom | .......... | B62B 3/1444 297/256.17 |
| 5,188,421 A * | 2/1993 | Arseneault | ............... | B60N 2/28 297/182 |
| 5,470,039 A * | 11/1995 | Hilger | .................... | A47D 5/006 248/164 X |
| 5,632,052 A * | 5/1997 | Michel | .................... | A47D 13/08 5/98.1 X |
| 5,778,465 A * | 7/1998 | Myers | ....................... | A47D 7/04 5/93.1 |
| 6,450,513 B1 * | 9/2002 | Bernstein | .............. | B62B 3/1468 280/33.991 |
| 6,526,608 B1 * | 3/2003 | Hsia | ......................... | A47D 7/04 5/98.1 X |
| 6,539,563 B1 * | 4/2003 | Hsia | ......................... | A47D 7/04 5/98.1 X |
| 6,848,743 B1 * | 2/2005 | Collins | .................. | B62B 3/1456 297/256.17 X |
| 7,475,885 B2 * | 1/2009 | Kovath | .................. | B62B 3/1468 280/33.991 |
| 7,530,635 B2 * | 5/2009 | Schramek-Flye | ....... | A47D 1/103 297/17 |
| 7,722,058 B2 * | 5/2010 | Giampavolo | ........... | B62B 3/144 280/33.991 |
| 8,001,630 B2 * | 8/2011 | Burkholder | ............... | A47D 7/04 5/98.1 X |
| 8,424,138 B1 * | 4/2013 | Pinnell | .................. | B62B 3/1444 5/118 |
| 8,677,533 B2 * | 3/2014 | Barron | ..................... | A47D 1/10 5/98.1 X |
| 9,622,592 B2 * | 4/2017 | Barron | ..................... | A47D 1/10 5/98.1 X |
| 2009/0205131 A1 * | 8/2009 | Bishop | ...................... | A45F 3/22 5/118 |
| 2010/0007106 A1 * | 1/2010 | Gibson | .................... | A47D 1/10 280/33.993 |
| 2014/0191547 A1 * | 7/2014 | Fink | ...................... | B62B 3/1444 297/256.17 |
| 2017/0217340 A1 * | 8/2017 | Estraykh | ............... | B62B 3/1444 |

\* cited by examiner

CAR SEAT HOLDER

The current application claims a priority to the U.S. Provisional Patent application Ser. No. 62/565,678 filed on Sep. 29, 2017. The current application is filed on Oct. 1, 2018 while Sep. 29, 2018 was on a weekend.

FIELD OF THE INVENTION

The present invention generally relates to car seats. More specifically, the car seat holder relates to an apparatus that spans across the width of a shopping cart, providing an elevated surface upon which a user may safely and conveniently place an infant within a standard removable car seat.

BACKGROUND OF THE INVENTION

A new parent must be ready to fully devote their time to caring for their infant. There can be no lapses of attention or windows of negligence, as murphy's law would suggest that the infant would certainly meet trouble. To this end, a wide variety of devices allow for monitoring of children and infants as they develop. From monitors to strollers to car seats, every precaution has been taken to ensure that an infant never has to be far from a caretaker's gaze. Further, many of these devices are well-equipped to provide a large amount of comfort to the infant.

Unfortunately, many of these devices are ill-equipped to address the issue of simultaneously caring for an infant and shopping for groceries. These activities combined provide a unique problem, specifically that carrying a baby in a car seat or stroller requires at least one hand and pushing a shopping cart requires two hands. To this end, the most common solution is for a parent or guardian to place a carriage or baby within a car seat into the shopping cart. On one hand, this does allow the parent to push the shopping cart while watching the infant or child. However, one common solution is for the parent or guardian to carry the infant in the car seat; in this case, the car seat the child is in takes up extra space within the shopping cart, making it difficult to add shopping items without smothering the infant or running out of space. What is needed is a hanging area capable of suspending the infant and the infant's mode of transportation over the shopping cart, thus freeing the space within the cart.

The present invention addresses this issue. The present invention is a car seat holder that allows the user to suspend a car seat, with a contained infant, above the base of a shopping cart. The present invention has two rods of adjustable length that span the width of the shopping cart. The rods support a hanging hammock that is capable of supporting the weight of an infant and an infant carrier. An adjustable band spanning between and connecting the two rods allows the user to lift and change the position of the present invention before or during use. In this way, the base of the cart is freed for the addition of items.

DETAILED DESCRIPTION OF THE INVENTION

All illustrations of the drawings are for the purpose of describing selected versions of the present invention and are not intended to limit the scope of the present invention.

Figure 1:
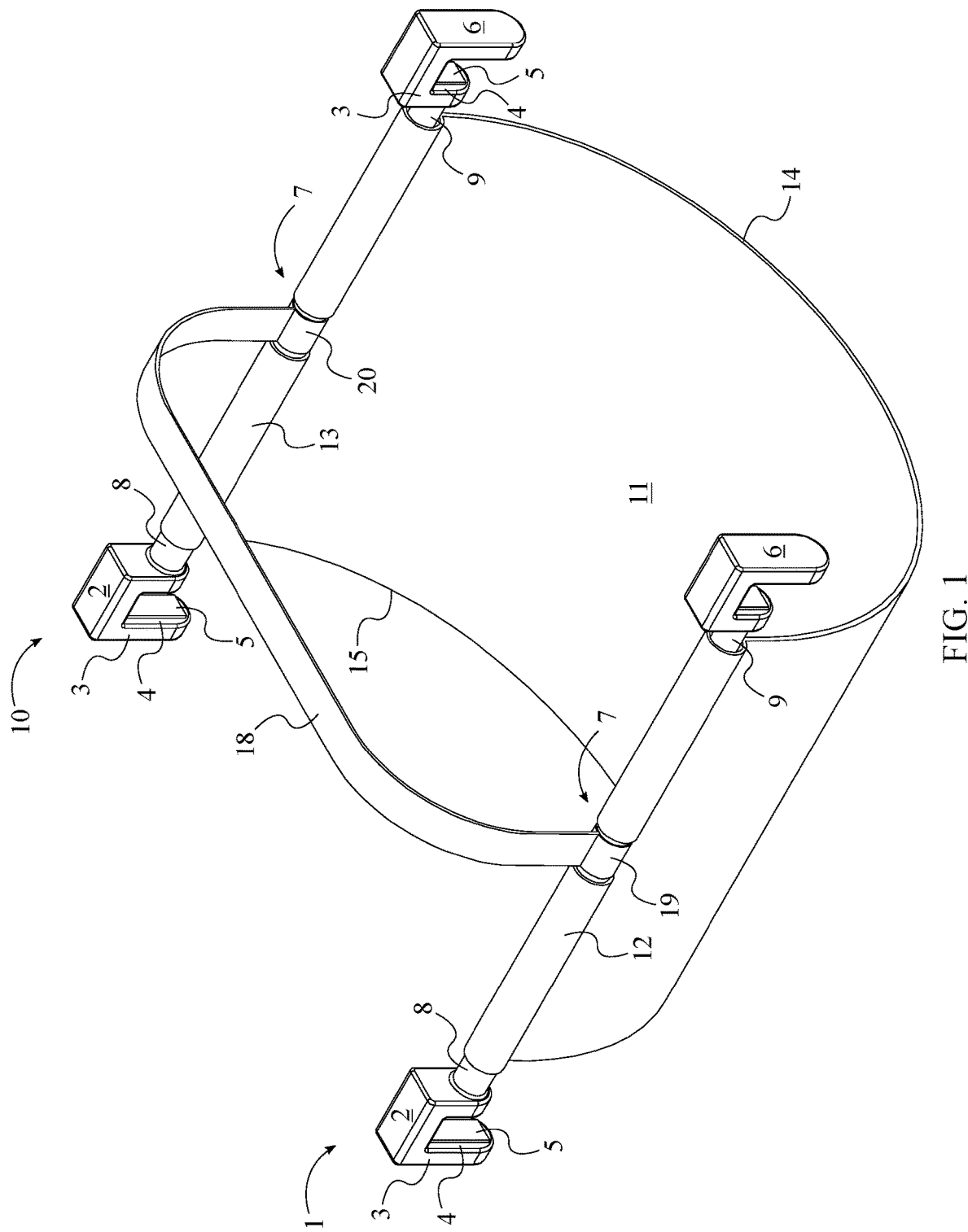
FIG. 1 is a front-top perspective view of the present invention.

The present invention is a car seat holder that is used to support a portable infant car seat by providing a flexible support. The present invention is also configured to adjust to different shopping cart sizes or widths and to collapse for ease of storage and transportation. The present invention comprises a first support 1, a second support 10, and a canvas 11, as seen in FIG. 1. The first support 1 and the second support 10 are elongated members that extend across a shopping cart in the preferred usage of the present invention. The first support 1 and the second support 10 are rigid members that distribute the weight of an infant carriage device. The canvas 11 is a flexible surface that extends from the first support 1 to the second support 10 across the shopping cart. The canvas 11 provides a mechanism for transmitting the weight of the infant carriage device to the first support 1 and the second support 10.

Figure 2:
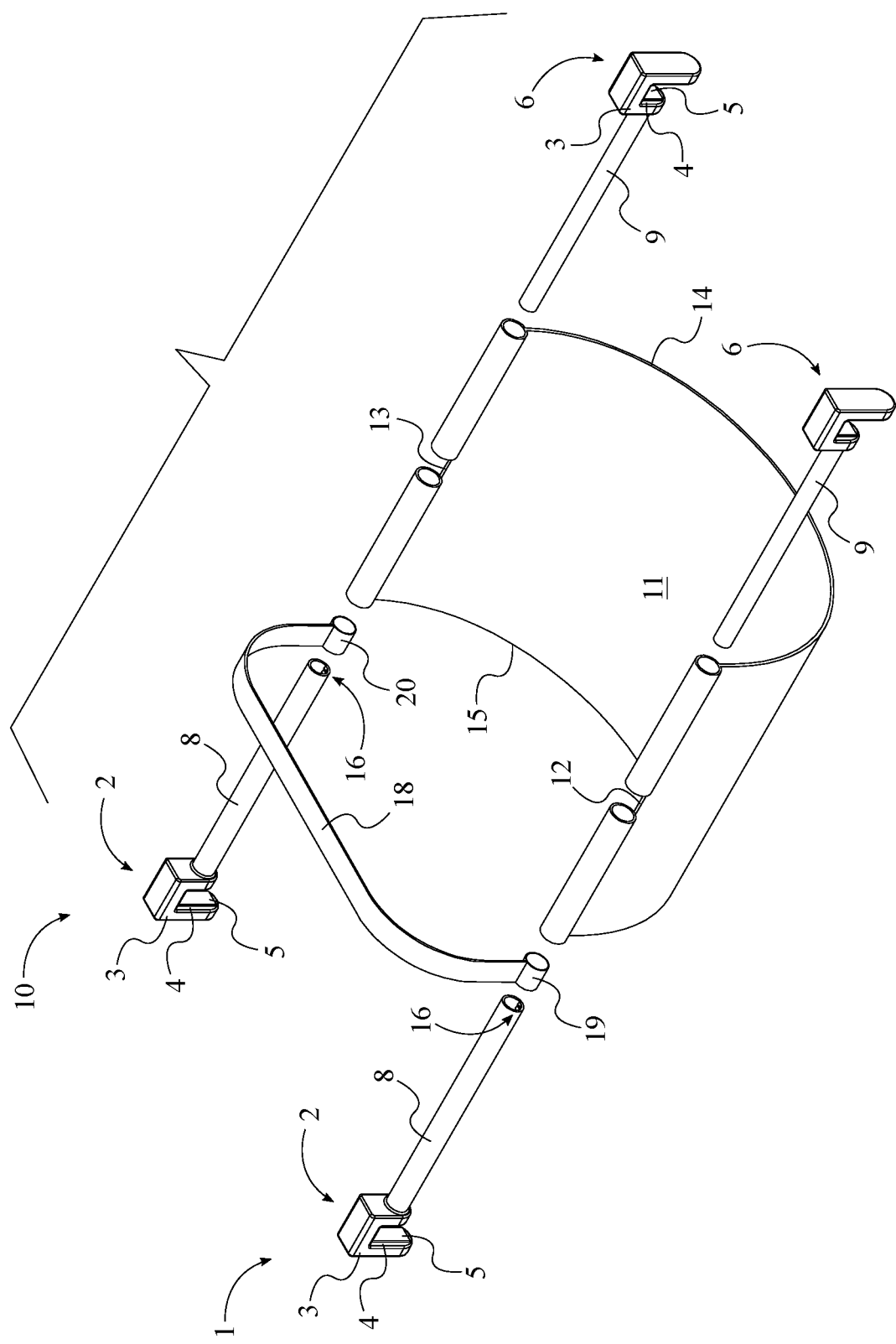
FIG. 2 is an exploded front-top perspective view of the present invention.

The general configuration of the aforementioned components allows the present invention to efficiently and effectively contain and lift a portable infant car seat. The first support 1 and the second support 10 each comprise a left bracket 2, a right bracket 6, and a length-adjustable member 7, as seen in FIG. 2. The left bracket 2 is the rigid connector that joins the first support 1 and the second support 10 to a shopping cart. The right bracket 6 is a similar rigid connector that joins the first support 1 and the second support 10 to a shopping cart, opposite the left bracket. In this way, the left bracket 2 and the right bracket 6 allow for transmission of gravitational forces from the first support 1 and the second support 10 onto the framework of the shopping cart. The length-adjustable member 7 is a set of concentric tubes or hollow supports that telescope within each other to allow the present invention to change size. This arrangement enables smooth modification of the length of the first support 1 and the second support 10 in order to match the spanning distance of the shopping cart.

Furthermore, the canvas 11 comprises a first edge 12 and a second edge 13. The first edge 12 and the second edge 13 are positioned opposite each other, defining the border of the canvas 11, as seen in FIG. 2. The left bracket 2 is terminally connected to the length-adjustable member 7. Similarly, the right bracket 6 is terminally connected to the length-adjustable member 7, opposite the left bracket 2. This arrangement allows the length-adjustable member 7 to expand to the appropriate size to fit atop a shopping cart. The first edge 12 and the second edge 13 are positioned opposite to each other across the canvas 11. This arranges the first edge 12 and the second edge 13 in optimal position for connecting to the first support 1 and the second support 10. The first edge 12 is slidably connected along the length-adjustable member 7 of the first support 1. This arrangement allows the first edge 12 to move along the length-adjustable member 7, thus providing the canvas 11 with the ability to adjust due to the weight of held items. Similarly, the second edge 13 is slidably connected along the length-adjustable member 7 of the second support 10. This arrangement allows the second edge 13 to move along the length-adjustable member 7, thus providing the canvas 11 with the ability to adjust due to the weight of held items.

In order to connect the present invention securely to a shopping cart, the left bracket 2 and the right bracket 6 must each be adequately equipped to brace against a shopping cart. To this end, the left bracket 2 and the right bracket 6 each comprise a U-shaped body 3 and a padding 5. The U-shaped body 3 is arranged to situate comfortably atop the edge of a shopping cart. The padding 5 prevents the present invention from becoming damaged during use or from the vibration from using the cart to impact an infant contained within the present invention itself. Further, the U-shaped body 3 comprises an inner surface 4, as seen in FIG. 1. The inner surface 4 is the surface which is pressed against a shopping cart in the preferred usage of the present invention. The padding 5 is connected along the inner surface 4. This arrangement ensures that the padding 5 is appropriately positioned for usage upon a shopping cart.

Figure 4:
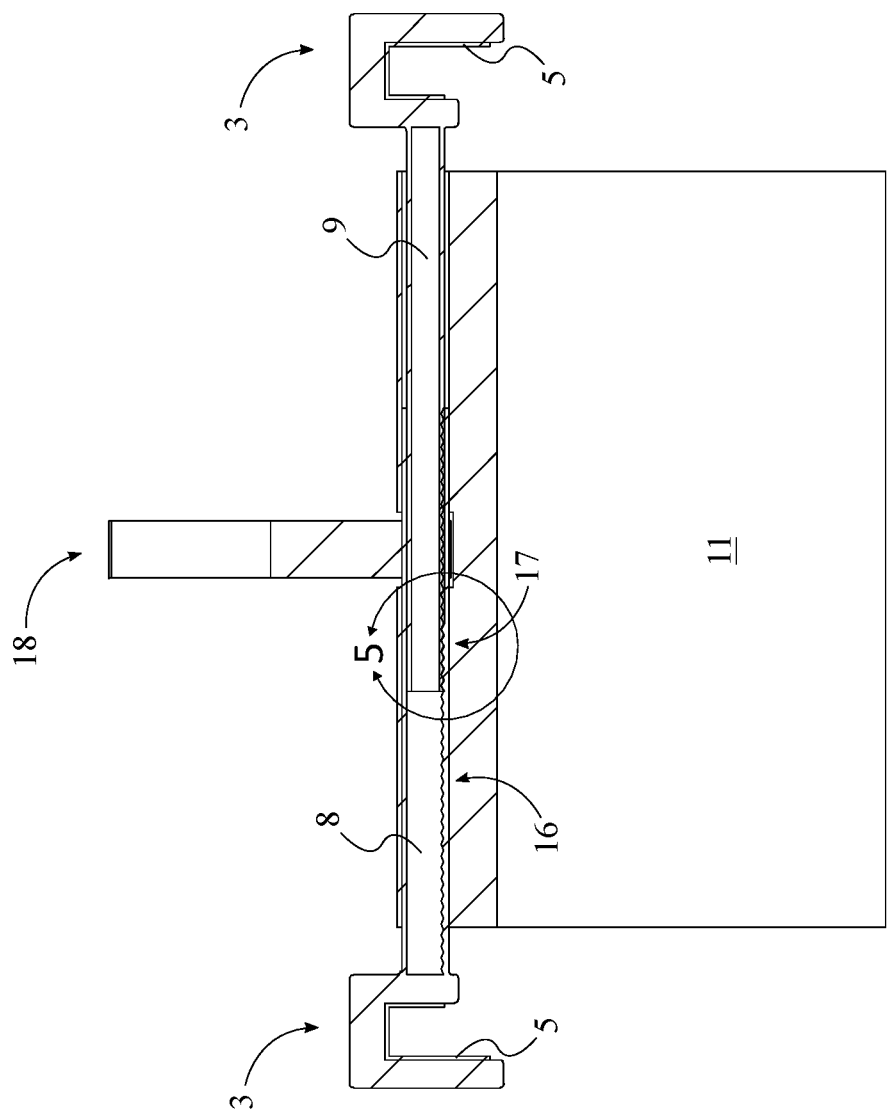
FIG. 4 is a left cross-sectional view of the present invention taken along line 4-4 in FIG. 3.

In order to operate properly, the present invention requires that the length-adjustable member 7 can expand, and contract as needed. To this end, the length-adjustable member 7 comprises a first tubular body 8 and a second tubular body 9, seen in FIG. 4. The first tubular body 8 is a hollow cylindrical member that allows for the present invention to fit upon a shopping cart. Similarly, the second tubular body 9 is a hollow cylindrical member that allows for the present invention to fit upon a shopping cart. In this way, the first tubular body 8 and the second tubular body 9 are positioned to be telescopically engaged to each other. This allows for modification and control over the length of the length-adjustable member 7.

Figure 5:
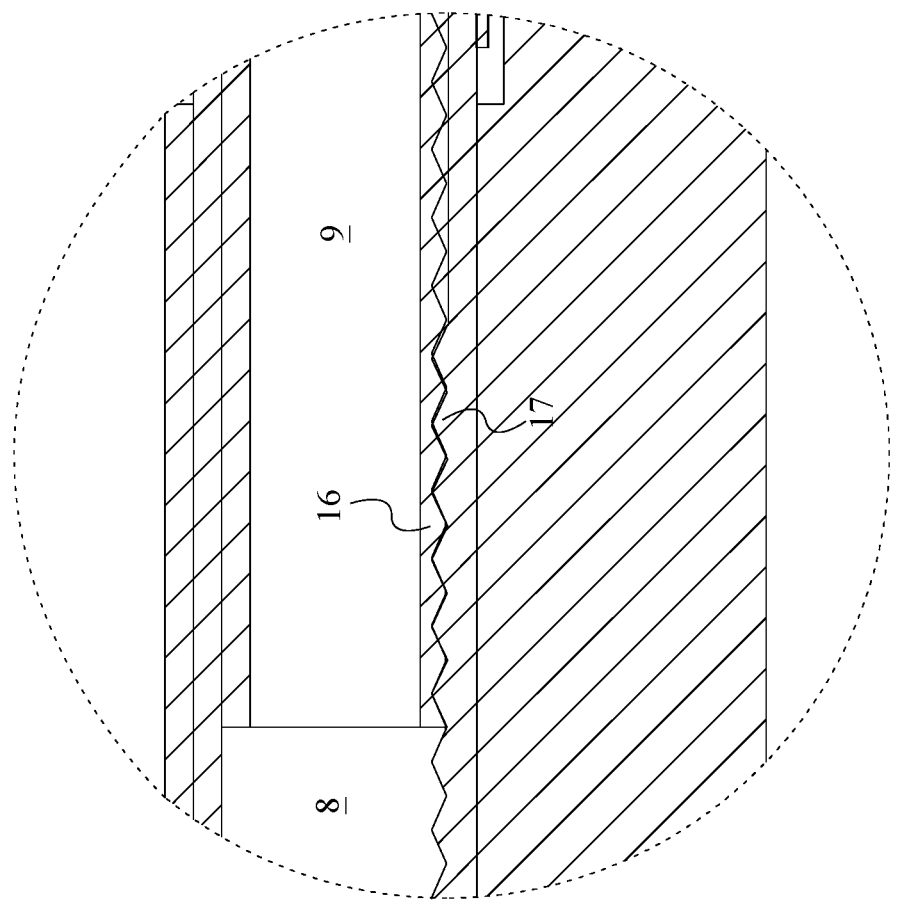
FIG. 5 is a detailed view of the present invention taken about circle 5 in FIG. 4.

Upon modifying the length of the length-adjustable member 7, the user may wish to lock the first tubular body 8 and the second tubular body 9 in place with respect to each other. To this end, the present invention comprises a first set of teeth 16 and a second set of teeth 17, as seen in FIG. 5. The first set of teeth 16 is a linear pattern of triangular extrusions that allows for engagement of the second set of teeth 17. The first set of teeth 16 is connected along the first tubular body 8. The first set of teeth 16 extend across a short distance of the first tubular body 8. The second set of teeth 17 is connected along the second tubular body 9. The second set of teeth 17 extend across the length of the second set of teeth 17. The first set of teeth 16 and the second set of teeth 17 are slidably interlocked with each other. In this way, the user may slide the first tubular body 8 within the second tubular body 9 and lock the first tubular body 8 in place relative to the second tubular body 9.

The present invention further comprises a length-adjustable strap 18. The length-adjustable strap 18 is a flexible fabric unit that allows for movement of the present invention from place to place. The length-adjustable strap 18 comprises a first strap end 19 and a second strap end 20, as seen in FIG. 2. The first strap end 19 and the second strap end 20 allow for connection of the length-adjustable strap 18 to the present invention. The first strap end 19 is rotatably connected to the length-adjustable member 7 of the first support 1. This allows the first strap end 19 to adjust in position relative to the first support 1. The second strap end 20 is rotatably connected to the length-adjustable member 7 of the second support 10. This allows the second strap end 20 to adjust in position relative to the second support 10.

Figure 6:
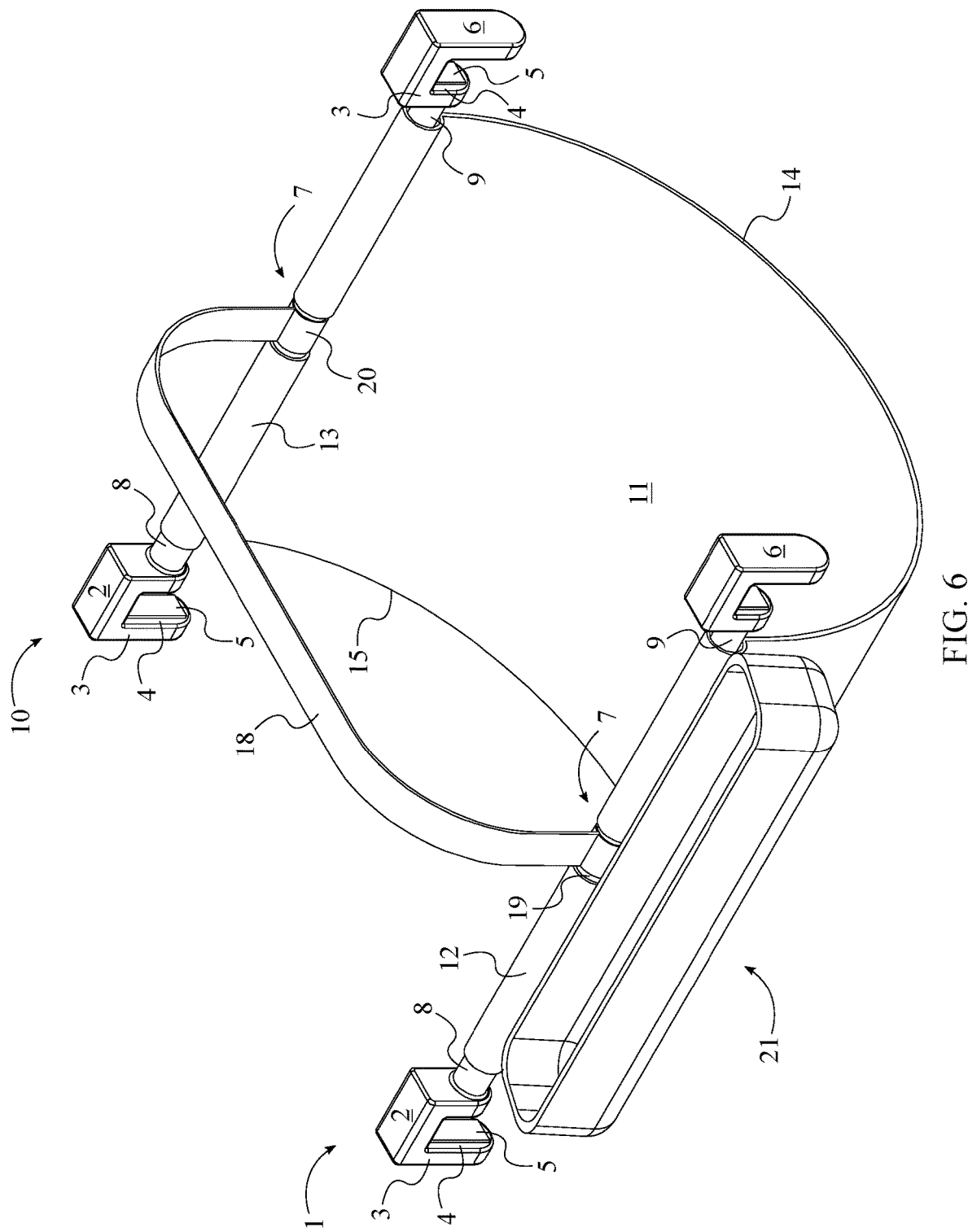
FIG. 6 is a front-top perspective view of the basket.

In an exemplary embodiment, the user may wish to carry or transport items other than an infant car seat in the present invention. To address this need, in an alternative embodiment, the present invention further comprises a basket 21, seen in FIG. 6. The basket 21 is a section of the present invention that allows for containment of items near the canvas 11. The basket 21 is mounted along the first support 1. Further, the basket 21 is positioned opposite to the canvas 11 about the first support 1. This positioning and orientation ensure that the basket 21 is positioned optimally for item storage.

Figure 3:
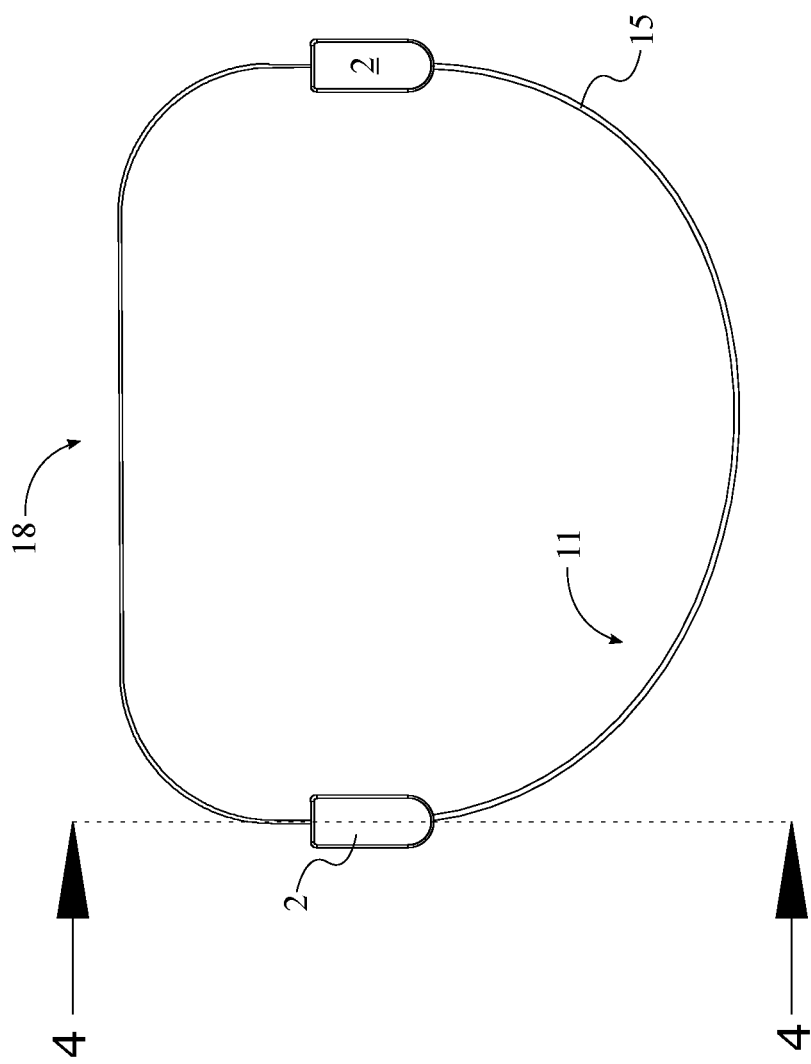
FIG. 3 is a left view of the present invention.

Optimal cart width usage is required to guarantee secure containment of a portable car seat. To this end, the canvas 11 further comprises a third edge 14 and a fourth edge 15. The third edge 14 and the fourth edge 15 are positioned opposite to each other across the canvas 11. This arrangement reinforces the space between the third edge 14 and the fourth edge 15. The third edge 14 and the fourth edge 15 are positioned in between the first edge 12 and the second edge 13. This ensures that the third edge 14 and the fourth edge 15 are along the sides of a shopping cart. The third edge 14 is positioned adjacent to the left bracket 2 of the first support 1 and the left bracket 2 of the second support 10. Similarly, the fourth edge 15 is positioned adjacent to the right bracket 6 of the first support 1 and the right bracket 6 of the second support 10, as seen in FIG. 3. This arrangement ensures that the canvas is optimally sized to completely span the width of a shopping cart.

The first tubular body 8 and the second tubular body 9 may be made of any of a variety of materials that enable telescopic motion of the length-adjustable member 7. In an exemplary embodiment, the first tubular body 8 and the second tubular body 9 traverse along the third edge 14 and the fourth edge 15. This arrangement allows the first tubular body 8 and the second tubular body 9 to hang from the sides of a shopping cart directly, as a supplemental support for the left bracket 2 and the right bracket 6. The length-adjustable strap 18 may utilize a rigid length-adjustment tool in order to assist in modifying the length of the length-adjustable strap 18. In another exemplary embodiment, the canvas 11 is made of rigid material, such that a contained infant in a car seat does not shift or swing while shopping.

Although the invention has been explained in relation to its preferred embodiment, it is to be understood that many other possible modifications and variations can be made without departing from the spirit and scope of the invention as hereinafter claimed.

What is claimed is:

1. A car seat holder comprises:
    a first support;
    a second support;
    a canvas;
    the first support and the second support each comprise a left bracket, a right bracket, and a length-adjustable member;
    the canvas comprises a first edge and a second edge;
    the left bracket being terminally connected to the length-adjustable member;
    the right bracket being terminally connected to the length-adjustable member, opposite the left bracket;
    the first edge and the second edge being positioned opposite to each other across the canvas;
    the first edge being slidably connected along the length-adjustable member of the first support;
    the second edge being slidably connected along the length-adjustable member of the second support;
    a length-adjustable strap;
    the length-adjustable strap comprises a first strap end and a second strap end;
    the first strap end being rotatably connected to the length-adjustable member of the first support; and the second strap end being rotatably connected to the length-adjustable member of the second support.

2. The car seat holder as claimed in claim 1 comprises:
the left bracket and the right bracket each comprise a U-shaped body and a padding;
the U-shaped body comprises an inner surface; and
the padding being connected along the inner surface.

3. The car seat holder as claimed in claim 1 comprises:
the length-adjustable member comprises a first tubular body and a second tubular body; and
the first tubular body and the second tubular body being telescopically engaged to each other.

4. The car seat holder as claimed in claim 3 comprises:
a first set of teeth;
a second set of teeth;
the first set of teeth being connected along the first tubular body;
the second set of teeth being connected along the second tubular body; and
the first set of teeth and the second set of teeth being slidably interlocked with each other.

5. The car seat holder as claimed in claim 1 comprises:
a basket;
the basket being mounted along the first support; and
the basket being positioned opposite to the canvas about the first support.

6. The car seat holder as claimed in claim 1 comprises:
the canvas comprises a third edge and a fourth edge;
the third edge and the fourth edge being positioned opposite to each other across the canvas;
the third edge and the fourth edge being positioned in between the first edge and the second edge;
the third edge being positioned adjacent to the left bracket of the first support and the left bracket of the second support; and
the fourth edge being positioned adjacent to the right bracket of the first support and the right bracket of the second support.

7. A car seat holder comprises:
a first support;
a second support;
a canvas;
a length-adjustable strap;
the first support and the second support each comprises a left bracket, a right bracket, and a length-adjustable member;
the canvas comprises a first edge and a second edge;
the left bracket being terminally connected to the length-adjustable member;
the right bracket being terminally connected to the length-adjustable member, opposite the left bracket;
the first edge and the second edge being positioned opposite to each other across the canvas;
the first edge being slidably connected along the length-adjustable member of the first support;
the second edge being slidably connected along the length-adjustable member of the second support;
the length-adjustable strap comprises a first strap end and a second strap end;
the first strap end being rotatably connected to the length-adjustable member of the first support; and
the second strap end being rotatably connected to the length-adjustable member of the second support.

8. The car seat holder as claimed in claim 7 comprises:
the left bracket and the right bracket each comprise a U-shaped body and a padding;
the U-shaped body comprises an inner surface; and
the padding being connected along the inner surface.

9. The car seat holder as claimed in claim 7 comprises:
the length-adjustable member comprises a first tubular body and a second tubular body; and
the first tubular body and the second tubular body being telescopically engaged to each other.

10. The car seat holder as claimed in claim 7 comprises:
a first set of teeth;
a second set of teeth;
the first set of teeth being connected along the first tubular body;
the second set of teeth being connected along the second tubular body; and
the first set of teeth and the second set of teeth being slidably interlocked with each other.

11. The car seat holder as claimed in claim 7 comprises:
a length-adjustable strap;
the length-adjustable strap comprises a first strap end and a second strap end;
the first strap end being rotatably connected to the length-adjustable member of the first support; and
the second strap end being rotatably connected to the length-adjustable member of the second support.

12. The car seat holder as claimed in claim 7 comprises:
a basket;
the basket being mounted along the first support; and
the basket being positioned opposite to the canvas about the first support.

13. The car seat holder as claimed in claim 7 comprises:
the canvas comprises a third edge and a fourth edge;
the third edge and the fourth edge being positioned opposite to each other across the canvas;
the third edge and the fourth edge being positioned in between the first edge and the second edge;
the third edge being positioned adjacent to the left bracket of the first support and the left bracket of the second support; and
the fourth edge being positioned adjacent to the right bracket of the first support and the right bracket of the second support.

14. A car seat holder comprises:
a first support;
a second support;
a canvas;
the first support and the second support each comprises a left bracket, a right bracket, and a length-adjustable member;
the canvas comprises a first edge and a second edge;
the left bracket being terminally connected to the length-adjustable member;
the right bracket being terminally connected to the length-adjustable member, opposite the left bracket;
the first edge and the second edge being positioned opposite to each other across the canvas;
the first edge being slidably connected along the length-adjustable member of the first support;
the second edge being slidably connected along the length-adjustable member of the second support the left bracket and the right bracket each comprise a U-shaped body and a padding;
the U-shaped body comprises an inner surface;
the padding being connected along the inner surface;
a length-adjustable strap;
the length-adjustable strap comprises a first strap end and a second strap end;
the first strap end being rotatably connected to the length-adjustable member of the first support; and the second strap end being rotatably connected to the length-adjustable member of the second support.

15. The car seat holder as claimed in claim 14 comprises:

the length-adjustable member comprises a first tubular body and a second tubular body; and the first tubular body and the second tubular body being telescopically engaged to each other.

16. The car seat holder as claimed in claim 15 comprises:

a first set of teeth;

a second set of teeth;

the first set of teeth being connected along the first tubular body;

the second set of teeth being connected along the second tubular body; and the first set of teeth and the second set of teeth being slidably interlocked with each other.

17. The car seat holder as claimed in claim 14 comprises:

a basket;

the basket being mounted along the first support; and the basket being positioned opposite to the canvas about the first support.

18. The car seat holder as claimed in claim 14 comprises:

the canvas comprises a third edge and a fourth edge;

the third edge and the fourth edge being positioned opposite to each other across the canvas;

the third edge and the fourth edge being positioned in between the first edge and the second edge;

the third edge being positioned adjacent to the left bracket of the first support and the left bracket of the second support; and the fourth edge being positioned adjacent to the right bracket of the first support and the right bracket of the second support.

* * * * *